United States Patent [19]

Scheuerpflug et al.

[11] 4,189,021
[45] Feb. 19, 1980

[54] HIGH-SPEED MOBILE WORKING MACHINE

[75] Inventors: Hans Scheuerpflug; Dieter Althoff, both of Bad Schönborn, Fed. Rep. of Germany

[73] Assignee: Firma Johannes Fuchs, Ditzingen, Fed. Rep. of Germany

[21] Appl. No.: 967,061

[22] Filed: Dec. 6, 1978

Related U.S. Application Data

[62] Division of Ser. No. 845,667, Oct. 26, 1977, abandoned.

[30] Foreign Application Priority Data

Oct. 26, 1976 [DE] Fed. Rep. of Germany ....... 2648414
Sep. 14, 1977 [DE] Fed. Rep. of Germany ....... 2741300

[51] Int. Cl.$^2$ .......................... B60K 41/28; E02F 3/00
[52] U.S. Cl. ................................. 180/54 C; 180/53 R; 180/53 CD; 180/306; 414/718
[58] Field of Search .................. 180/54 C, 66 R, 6.58, 180/6.6, 53 R, 53 CD; 414/718

[56] References Cited

U.S. PATENT DOCUMENTS

| 2,714,936 | 8/1955 | Gregory | 180/44 R |
| 2,728,463 | 12/1955 | Beckwith | 180/54 C |
| 3,104,528 | 9/1963 | Horig | 180/53 R |
| 3,599,814 | 8/1971 | Brownfield | 180/66 X |

*Primary Examiner*—Joseph F. Peters, Jr.
*Assistant Examiner*—Donn McGiehan
*Attorney, Agent, or Firm*—Wigman & Cohen

[57] ABSTRACT

This disclosure relates to high-speed mobile working machines comprising a first engine for the high-speed drive of the vehicle and a second engine for driving the working device, e.g., a crane or the like. The second engine drives pumps which feed hydraulic fluid to hydraulic motors which power the working device. In one embodiment a mechanical clutch is provided for selectively coupling the outputs of both the first and second engines and transmitting the summed power to the vehicle for high-speed drive. In another embodiment a hydraulic motor, feeded by the pumps for driving the vehicle during the working is provided, the output of which is selectively coupled with the first engine and the summed power is transmitted to the vehicle for high-speed drive.

8 Claims, 7 Drawing Figures

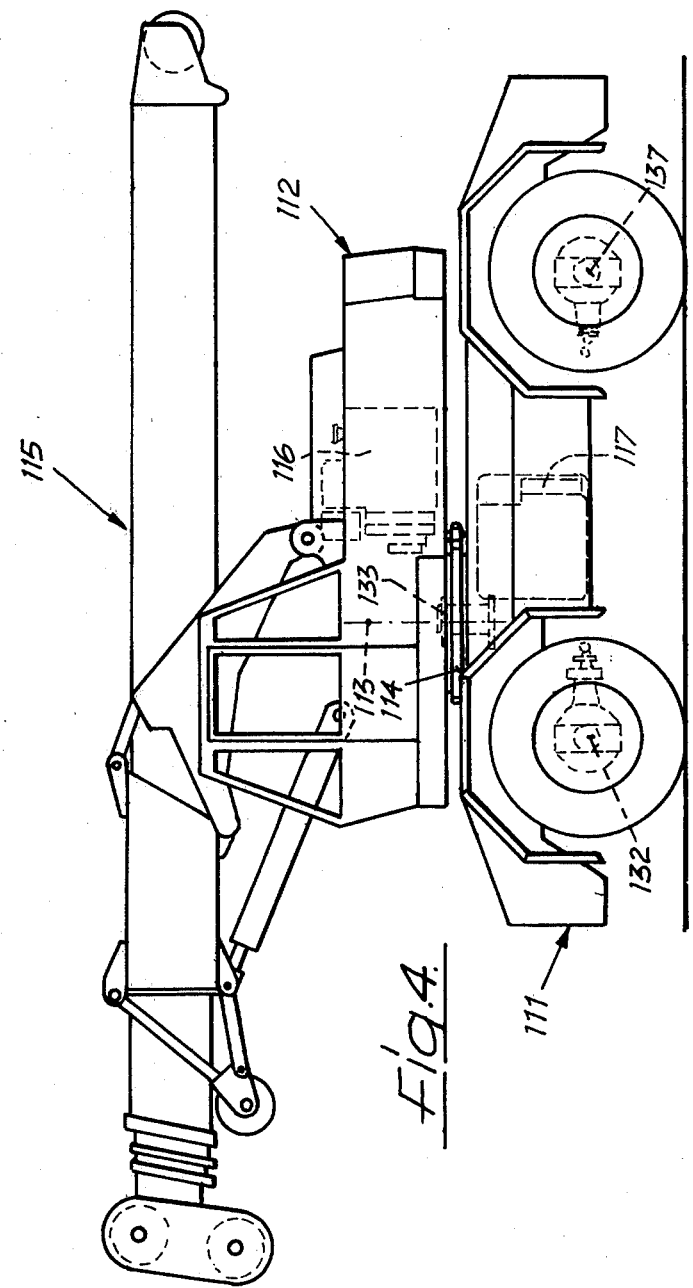

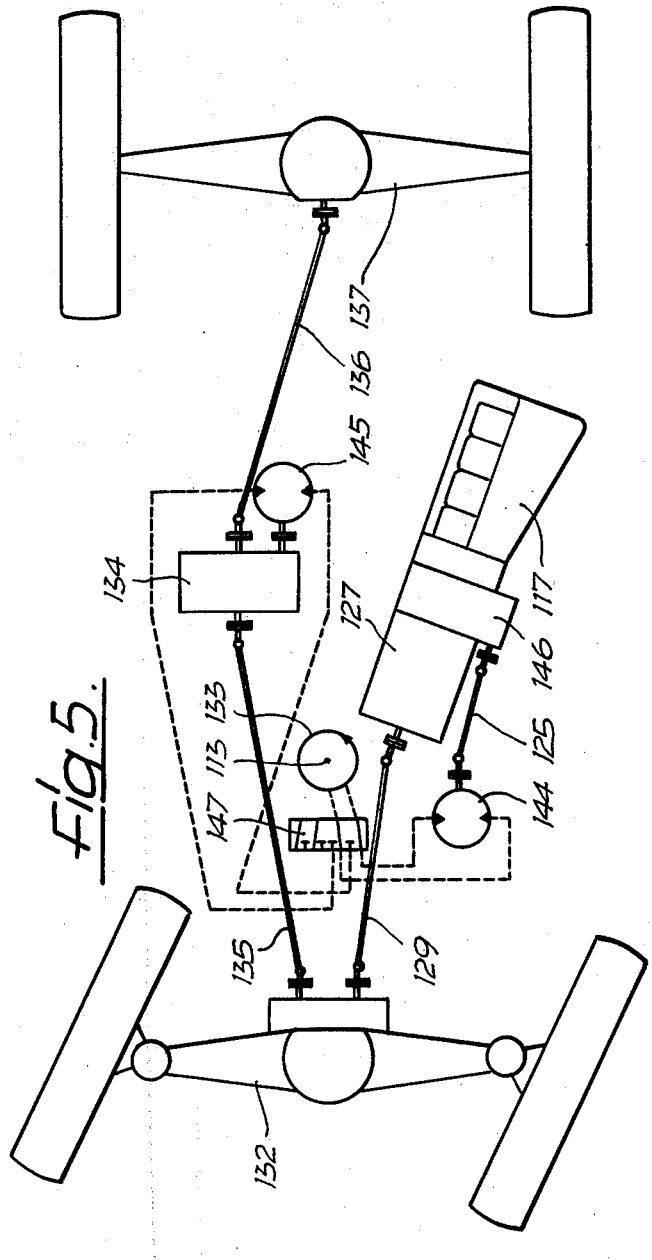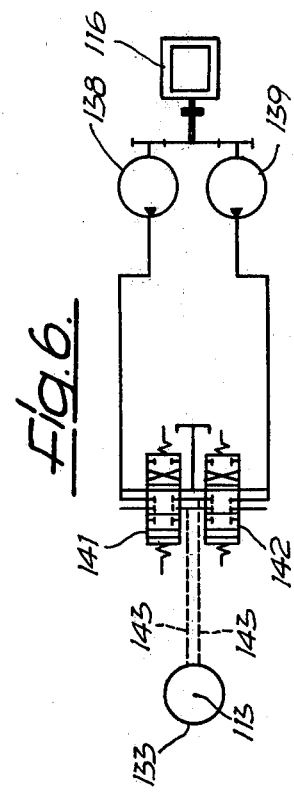

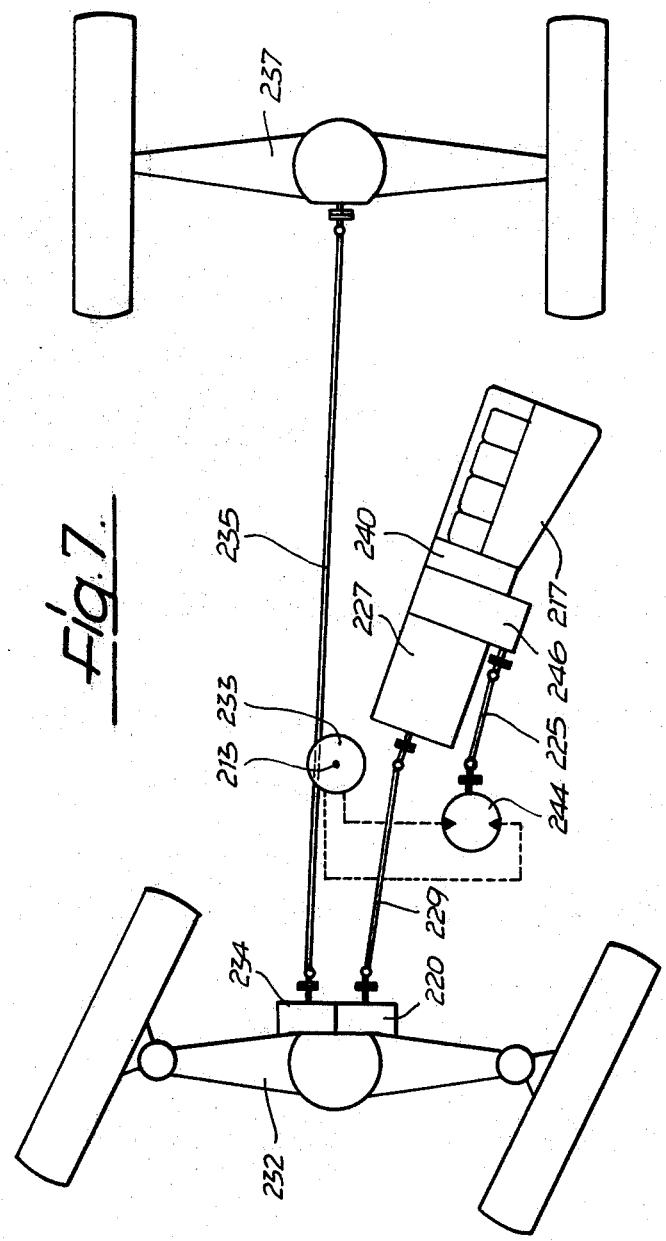

HIGH-SPEED MOBILE WORKING MACHINE

This is a division of application Ser. No. 845,667, filed Oct. 26, 1977, abandoned.

BACKGROUND OF THE INVENTION

This invention relates generally to mobile working machines such as mobile cranes, mobile excavators and the like, and more particularly to high-speed mobile working machines comprising a vehicle chassis having a rotatable superstructure upon which is mounted the working device, a first engine for the high-speed drive of the vehicle, and a second engine for driving the working device.

It is understood in the art that high-speed mobile working machines must be capable of being driven on high-speed highways having minimum speed limits of at least 60 km. per hour, for example. Consequently, the first engine for driving the vehicle must have the required power for attaining these speeds, e.g., 120 H.P., while the second engine for driving the working device of the machine might require substantially less power, e.g., 60 H.P.

It should be apparent, therefore, that the aforementioned requirements necessitate a large investment in total engine capacity for the machine, at substantial cost, which capacity is inefficiently utilized in prior art machines because each engine is used only for its specialized task and is normally dormant when the other engine is in operation.

SUMMARY OF THE INVENTION

In view of the foregoing, it should be apparent that a need still exists in the art for a high-speed mobile working machine that overcomes the disadvantages of prior art machines of this type. Accordingly, it is a primary object of this invention to provide a high-speed mobile working machine in which the overall engine capacity can be more efficiently utilized.

More particularly, it is an object of this invention to provide a high-speed mobile working machine having a first main engine for driving the vehicle and a second main engine for driving the working device, and wherein the power of both engines may be combined for driving the vehicle.

Another object of this invention is to provide a high-speed mobile working machine of reduced engine capacity as compared with prior art machines of this type while obtaining the same operating and high-speed efficiency.

These and other objects of the invention that may become more apparent hereinafter are accomplished in accordance with this invention by providing an apparatus that can be controlled for summing the power of both main engines for the high-speed drive. Because both engines for high-speed drive can be connected to each other by the controllable apparatus, the second engine, which in prior art mobile working machines is used only for operating the working machine and not for the vehicle drive, can now be used with its full power together with the first engine for producing the power for the high-speed drive. Thus, in order to produce a working machine which possesses the same operating and high-speed power as the above-described known example, in which the first engine is designed for a power of 120 H.P. and the second engine for a power of 60 H.P., in accordance with the invention, the first engine must be designed for only 60 H.P., since with the coupling of both engines for the high-speed drive, the live axle is driven by the sum of the power of both engines, namely by 120 H.P. Thus, to achieve the same operating and speed efficiency, in a working machine in accordance with this invention, the installed power can be reduced to ⅔ of the power of the above-mentioned working machine.

Since the chassis for the high-speed drive is driven mechanically by the first engine, for the low-speed drive during the operation of the working machine an expensive special gear mechanism, e.g., an automatic, infinitely variable and reversible gear, is usually required. However, this can be avoided in a preferred embodiment of the invention in that a hydraulic traction motor is provided in the chassis, which is connected to a pump in the super-structure by a rotary connection, also called a "center pin", in the axis of rotation of the super-structure. This permits the high-speed drive to use the mechanical drive of both engines coupled to one another for the vehicle high-speed drive, that is, of the first and second engines, and permits the slow-speed drive during the operation of the working machine to use an advantageous hydrostatic infinitely variable and fully reversible drive through the hydraulic motor.

In another embodiment of the invention, the apparatus for combining the power of both main engines comprises a gear mechanism, over which the first main engine and the hydraulic traction motor can be connected by a controllable gear mechanism to at least one live axle of the chassis. It is thus achieved that the rotary connection or center pin in the axis of rotation of the super-structure, which is provided in the first embodiment in order to drive a hydraulic traction motor in the chassis of the working machine during operation, can also be used for the apparatus for combining the power of both main engines, so that the invention provides an economical and efficiently functioning machine.

With the above and other objects in view that may become more apparent hereinafter, the nature of the invention will be more clearly understood by reference to the accompanying drawings, the following detailed description thereof, and the appended claimed subject matter; wherein;

FIG. 4 is a side view of a mobile crane according to a second and a third embodiment of the invention;

FIG. 5 is a plan view of the chassis of the mobile crane according to the second embodiment, in which the connection of the mechanical parts and the hydraulic connection are schematically represented;

FIG. 6 is a schematic illustration of the mechanical and hydraulic connections in the super-structure of the second and the third embodiment; and FIG. 7 is a plan view of the chassis of a high-speed mobile working machine according to the third embodiment of the invention.

DETAILED DESCRIPTION OF THE PREFERRED EMBODIMENTS

Figure 1:
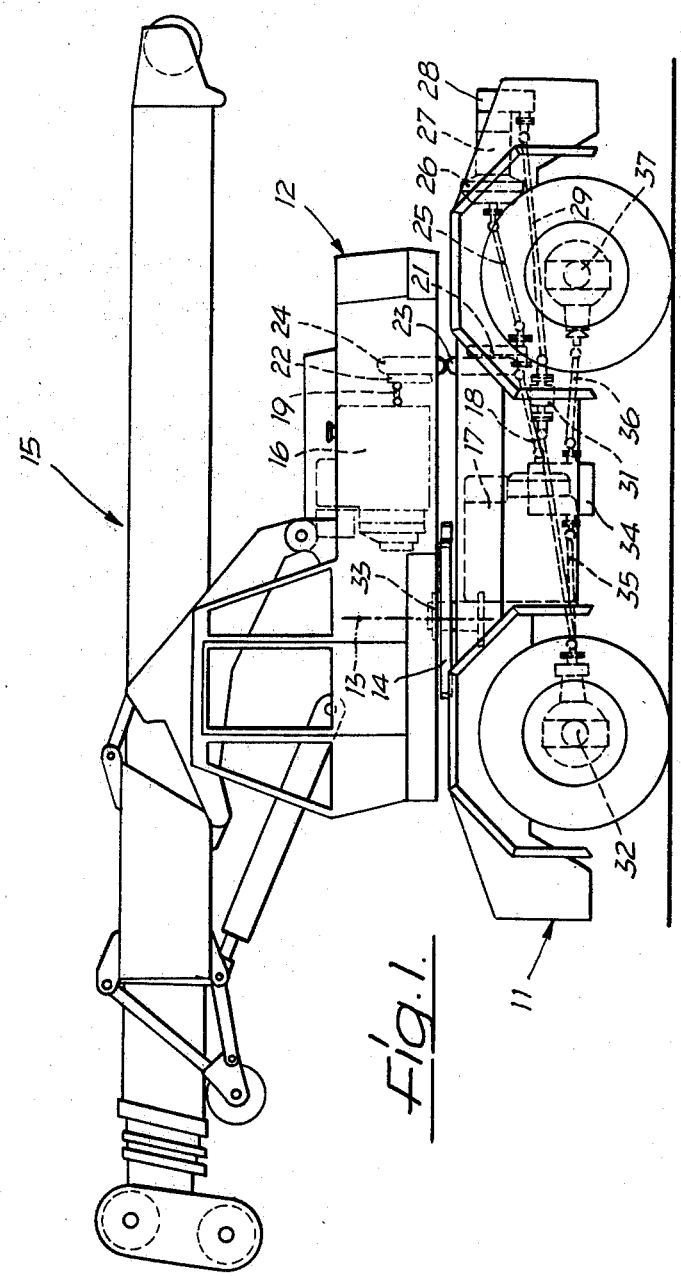
FIG. 1 is a side elevation view of a high-speed mobile crane according to the first embodiment of the invention.
Figure 2:
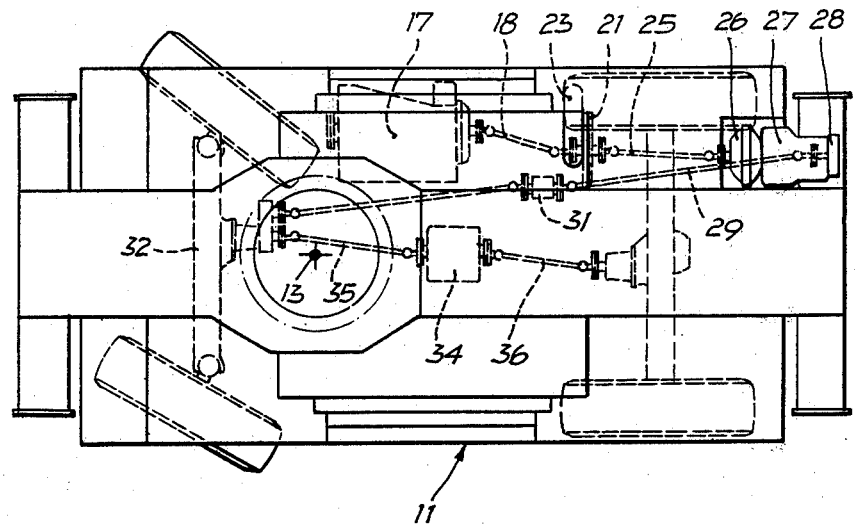
FIG. 2 is a plan view of the chassis of the same mobile crane according to FIG. 1.
Figure 3:
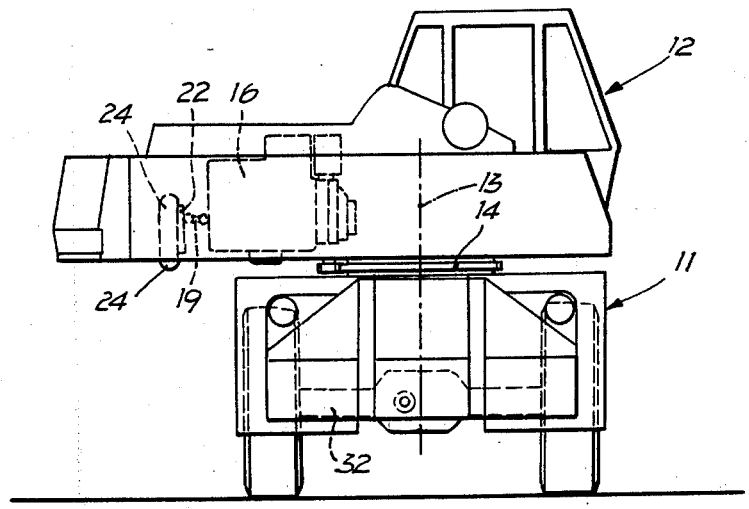
FIG. 3 is a front view of the same mobile crane according to FIGS. 1 and 2, with a super-structure turned at 90 degrees.

FIGS. 1-3 illustrate a mobile crane which comprises a chassis 11 forming the frame, on which a super-structure 12 is mounted, rotatable about a vertical axis 13 by means of a turntable 14. The super-structure 12 carries a jib 15 for which hydromotors are provided as driving elements, in a known manner and therefore not represented in the drawings. The hydromotors are supplied with hydraulic fluid by means of a pump, also not represented in the drawings, positioned in the super-structure, for which as a main drive means, a diesel engine 16, with a power of 60 H.P., positioned on one side of the vertical longitudinal axis of the super-structure, is provided, hereinafter referred to as the second engine.

As a main driving means for high-speed driving of the mobile crane a 60 H.P. diesel engine 17 is provided, also positioned on the one side of the vertical longitudinal axis of the chassis between both axles, and hereinafter referred to as the first engine.

The first engine 17 and the second engine 16 are each in the same way connected by a drive shaft 18, 19, respectively, (FIGS. 1 and 3) to a speed reduction gear 21, 22 respectively, over which they each drive a friction wheel, 23 and 24, respectively, in the form of a motor vehicle wheel, each mounted in the chassis and the super-structure, respectively. These wheels 23 and 24 are mounted in their respective structures rotatable about axes parallel to one another, so that their circumferential surfaces touch to form a clutch in the high-speed position of the super-structure 12 represented in FIG. 1.

The torque transmitted from the engine 17 through the drive shaft 18 is transmitted without speed transmission at the speed reduction gear 21, to a drive shaft 25, which is connected over a clutch 26, to a gearbox 27, through which the drive force of the first engine 17 is transmitted over a spur gearing 28 to a drive shaft 29 with intermediate bearings 31, the other end of said drive shaft 29 being connected to the front axle 32 of the chassis 11. In this way the front axle 32 of the chassis can be powered for high-speed drive directly by the first engine 17 through the clutch 26, the gearbox 27, and the spur gearing 28, and simultaneously by the second engine 16 through the friction coupling made by the two friction wheels 23 and 24, so that together a power of 120 H.P. results.

For the drive of the mobile crane during operation, the pump (not shown) in the super-structure 12 is connected to a hydromotor of a power distribution gear box 34, by a duct not represented in the drawing and which is guided along the axis of rotation of the super-structure through a center pin or rotary connection 33. this distribution gear box 34, is connected to the front axle 32 and the rear axle 37 of the chassis by the drive shafts 35 and 36, respectively.

For the drive of the mobile crane during operation, an infinitely variable and reversible transmission thus results, which can be powered by the 60 H.P. rating of the second engine 16 and thereby fully satisfies the requirements during operation. In high-speed drive, in the high-speed position of the super-structure 12, the second engine 16 is coupled with the first engine 17 through the friction wheels 23 and 24, so that a combined power of 120 H.P. is now available for driving the front axle 32. The change-over and control elements here necessary are known to those skilled in the art, so that a detailed description thereof is unnecessary.

Since both engines 16, 17 are positioned on the same side of the mobile crane, they are both readily accessible. Furthermore, through the lateral position of the first engine 17, a closed chassis frame is possible, which can be produced in a lightweight construction that is low in cost. Due to the low position of the first engine, it does not project above the height of the base of the turntable 14, and thereby does not cause any restrictions in the rearward overhang of the super-structure 12. In case of failure of one of either engines 16 or 17, the mobile crane can be driven by the engine still functioning in either case.

In the illustrated embodiment, the distribution gear box 34 can be omitted, since the drive of the mobile crane can also result solely from one of the engines 16, 17, or from both during operation.

In cases where greater power is needed for driving on highways, a third engine with gearbox, not shown, can be positioned on the side diametrically opposite the first engine. If in such an embodiment also the hydrostatic drive of both shafts is provided, then an overload of the front drive through this increase of power need not be feared, because the axles must then be proportioned to the much greater hydrostatic drive during transmission.

The second friction wheel 24 is connected to the super-structure 12 in such a way that it can be adjusted to two different vertical positions whereby the upper position is so selected that both friction wheels 23 and 24 do not touch one another in the high-speed drive position of the super-structure. The purpose of this is that during operation, when the super-structure turns, interference caused by the touching together of both friction wheels which are constantly rotating with the engines 16 and 17 need not be feared. The second embodiment of the mobile crane represented in FIGS. 4-6 comprises a chassis 111 forming the frame on which a super-structure 112 is mounted rotatable about a vertical axis 113 by means of a turntable 114. The super-structure 112 carries a jib 115, for which hydromotors are provided as driving elements in the known way and therefore not represented in the drawings. The hydromotors are fed by two pumps 138 and 139 over control elements not represented in the drawings. As main driving means for driving both of these pumps 138 and 139 a diesel engine 116 is provided in the super-structure, said engine 116 hereinafter referred to as the second main engine.

Each of the pumps 138 and 139 can be connected to a center pin or rotary connection 133 by a control valve 141, 142, respectively, each through pressure conduits 143, and in such a way that each of said pumps 138 or 139, singly or both at the same time, can be connected to this rotary connection 133.

In the chassis 111, as main driving means for the drive of the mobile crane, a diesel engine, hereinafter referred to as the first main engine 117, is provided which has the same power as the second main engine 116 provided in the super-structure, as well as two hydraulic motors 144 and 145. Both of these motors can be selectively connected by a control valve 147 over the rotary connection 133 to the pressure conduits 143.

The first main engine 117 powers a gear 146, to which also the first hydraulic motor 144 for summing the power of both engines is connected by a drive shaft 125. The output drive of this gear 146 is connected to steering front axle 132 of the mobile crane over a gearbox 127 and a drive shaft 129.

This front axle 132 is itself connected to a controllable distribution gear box 134 by a drive shaft 135 which is connected by another drive shaft 136 to the rear axle 137 of the mobile crane and to the second hydraulic motor 145.

During driving on highways the super-structure 112 is in the position represented in FIG. 4, in which the driver's cabin of the super-structure is above the front axle 132. The control valve 147 is here in the position represented in FIG. 5, in which the first hydraulic motor 144 is connected to the rotary connection 133 and through this to the pressure conduits 143 of the super-structure. Both control valves 141, 142 are thereby so adjusted that both pumps 138 and 139 are connected to the pressure conduit 143. It is thus achieved that the full power of the second main engine 116 in the super-structure is transmitted to the first hydraulic motor 144 in the chassis. This first hydraulic traction motor 144 transmits its power through the drive shaft 125 to the gear box 146 which simultaneously receives the power of the first main engine 117. In this way the power of both main engines 116 and 117 are summed in the gear box 146. The desired revolutions of the front axle 132 can now be selected with this gearbox 127. It is alo possible to drive both axles during high-speed drive because the front axle 132 can be connected to the rear axle 137 by the distribution gear box 134.

During operation of the crane, the front axle 132 is disconnected from the gear box 146 by means of the gearbox 127. The control valve 147 is so adjusted that the second hydraulic motor 145 is then connected to the rotary connection 133 and thus to the pressure conduit 143. One or both pumps 138 and 139 can be selectively connected to the pressure conduits 143 by means of the control valves 141 and 142. The live axles 132 and 137 can then be driven by the second hydraulic motor 145, either singly or together, according to the control of the distribution gear box 134. During operation, the crane can be driven at a low speed by connecting one of the pumps 138 or 139 to the pressure conduits 143, and at double that speed by engaging both pumps 138 and 139.

Instead of the controllable distribution gear box 134, a simple gear can also be provided by means of which either only one live axle 132 or 137 or both live axles 132 and 137 simultaneously can be driven by the second hydraulic traction motor 145, without the possibility of selection control.

Corresponding to FIG. 5, FIG. 7 illustrates the chassis of any working machine, e.g., a mobile excavator. The connection in the super-structure, represented in FIG. 6, also applies to this embodiment.

The side view of the mobile crane, represented in FIG. 4, likewise applies to this embodiment.

To avoid undue repetition, those parts in FIG. 7 which correspond to those of the embodiments previously described have been marked with reference numbers increased by 100, so that reference can be made to the description of the preceding embodiments.

The third embodiment of this invention represented in FIG. 7 differs from the preceding embodiment in that here only one hydraulic traction motor 244 is provided, which is directly connected to the rotary connection 233, concentric with the axis of rotation 213 of the super-structure. Another difference is that here the gear box 246 is connected to the first motor 217 over a clutch 240 and the gearbox 227 is connected to the front axle 232 by the drive shaft 229 and a gearbox 220. Finally, both live axles 232 and 237 here are connected to one another by a disengageable clutch 234 and a drive shaft 235. Despite the resulting saving of the second hydraulic motor 145, of the distribution gear box 134 and of the control valve 147, this embodiment achieves the same result as the preceding embodiment.

During driving on highways, both pumps 138 and 139 are connected directly to the hydraulic motor 244 by means of control valves 141 and 142 through the pressure conduits 143 and the rotary connection 233. Thus, the full power of the second main engine 116 in the super-structure is transmitted to the hydraulic motor 244 in the chassis, which transmits its power through the drive shaft 225 to the gear box 246, which receives the power of the first main engine 217 at the same time.

The thus combined power of both engines is then transmitted by the gearboxes 227 and 220 to the front axle 232 and, according to the control of the clutch 234, also to the rear axle 237. The gearbox 220 is preferably adjusted to a transmission ratio of 1:1, so that only the gearbox 227 need be actuated during driving.

During operation of the working machine, the first engine 217 is disconnected from the gearbox 246 by means of the clutch 240, so that said gearbox 246 can only be powered by the hydraulic motor 244. For moving the working machine during operation the gearbox 220 is operated for reduction. This gearbox 220 no longer need be controlled while moving the working machine during operation. In order to be able to manage with the smallest reduction in this gearbox 220, the gearbox 227 is set at the lowest ratio, namely the reverse gear. Besides, only one of the pumps 138 or 139 is connected by the coordinated control valve 141 or 142, respectively, to the pressure conduits 143 and in such a way that the pressure stream circulates in the opposite direction, so that the hydraulic motor 244 rotates in the opposite direction than it does in high-speed drive. Thus, although the gearbox 227 is set at reverse gear, the forward movement of the working machine is achieved. By using only one of the pumps 138 or 139 and by setting the gearbox 227 in reverse gear, a very great reduction in revolutions is achieved, so that the reduction ratio of the gearbox 220 for the operation can be kept very low. In many cases it is also possible to completely omit the gearbox 220. The speed during operation can be doubled by connecting both pumps 138 and 139. By reversing the control valves 141 and 142, respectively, driving in reverse is also possible with the same transmission.

In the embodiments described above, both main engines 17 and 16 or 117 and 116 or 217 and 216, respectively, have the same power. For the invention, however, it is only important that the first main engine 17 or 117 or 217, respectively, has the power that enables it, together with the second engine 16 or 116 or 216, respectively, which is designed for the operation of the working machine, to achieve the maximum speed desired while driving on highways.

Although only preferred embodiments of the invention have been specifically illustrated and described herein, it is to be understood that minor modifications could be made therein without departing from the spirit and scope of the invention as defined in the appended claims.

We claim:

1. A high-speed mobile working machine comprising a vehicle having a chassis and a super-structure, said chassis having at least two live axles and said super-structure being mounted on said chassis for rotation about a vertical axis, a working device carried by said super-structure, first main driving means for driving said vehicle, second main driving means for driving said working device, and controllable means connected to both said first and second main driving means for summing the power of both said first and second main driving means and for transmitting the summed power to at least one of said live axles for driving said vehicle at a high-speed;

including at least one pump means for feeding hydraulic fluid for driving said working device, said pump means being operatively connected to said second main driving means, a first and a second hydraulic motor means for driving at least one of said live axles of said vehicle, said at least one pump means and said first and second hydraulic motor means being connected by a fluid conduit means;

said first hydraulic motor means and said first main driving means being mounted in said chassis and said at least one pump means being mounted in said super-structure, said fluid conduit means comprising a first part being connected to said first hydraulic motor means and mounted in said chassis, a second part being connected to said pump means and mounted in said super-structure, and a rotary connection connecting said first and said second parts and being arranged coaxially to the vertical axis of rotation of said super-structure;

and control valve means for selectively connecting said first and said second hydraulic motors to said at least one pump means.

2. A high-speed mobile working machine comprising a vehicle having a chassis and a super-structure, said chassis having at least two live axles and said super-structure being mounted on said chassis for rotation about a vertical axis, a working device carried by said super-structure, first main driving means for driving said vehicle, second main driving means for driving said working device, at least one pump means for feeding hydraulic fluid for driving said working device, said pump means being operatively connected to said second main driving means, a first and a second hydraulic motor means for driving at least one of said live axles of said vehicle for high speed and for working speed, respectively, said at least one pump means being connectable with said first and second hydraulic motor means by a fluid conduit means;

said fluid conduit means comprising a first, a second, a third and a fourth part, a rotary connection, and at least one control valve having an input and a first and a second output, said first main driving means, said first and second hydraulic moror means, said first, second and third parts of said conduit means, and said at least one control valve being mounted in said chassis and said second main driving means, said at least one pump means and said fourth part of said fluid conduit means being mounted on said super-structure;

said first and second parts of said fluid conduit means connecting said first and second hydraulic motor means with said first and second outputs of said at least one control valve, said third part of said conduit means connecting said input of said at least one valve means with said rotary connection, said rotary connection connecting said third part with said fourth part of said conduit means, said fourth part connecting said rotary connection with said at least one pump means; and controllable means, connected to both said first main driving means and said first hydraulic motor means, for summing the power of both said first and second main driving means and for transmitting the summed power to at least one of said live axles for driving said vehicle at a high-speed.

3. A high-speed mobile working machine as defined in claim 2, wherein said controllable means for summing the power includes a summing gearbox having first and second inputs and an output, said first main driving means and said first hydraulic motor means being operatively connected with said first and said second inputs, respectively, and means, including a controllable gearbox, for connecting said output of said summing gearbox with at least one of said live axles of said chassis.

4. A high-speed mobile working machine as defined in claim 2, wherein selectively operable means are provided for connecting and disconnecting said second hydraulic motor means with at least one of said live axles.

5. A high-speed mobile working machine as defined in claim 2, wherein connecting means are provided for operatively connecting said at least one with the other of said two live axles.

6. A high-speed mobile working machine as defined in claim 5, wherein said connecting means comprises selectively operable means for disengaging the connection between said two live axles.

7. a high-speed mobile working machine as defined in claim 4, wherein said selectively operable means includes a controllable distribution gearbox having an input and a first and a second output, said second hydraulic motor means is operatively connected with said input, and said at least one and the other of said two live axles are operatively connected to said first and said second output of said distribution gearbox, respectively.

8. A high-speed mobile working machine as defined in claim 3, further comprising a second pump means mounted on said super-structure and a selectively controllable second valve means for connecting each of said at least one and said second pump means with said fourth part of said fluid conduit means.

* * * * *